United States Patent
Ishikawa et al.

(10) Patent No.: US 6,521,671 B1
(45) Date of Patent: Feb. 18, 2003

(54) MICELLE DISPERSION AND METHOD FOR PREPARATION THEREOF

(75) Inventors: Motoharu Ishikawa, Chiba-ken (JP); Hideaki Kurata, Chiba-ken (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 09/673,663

(22) PCT Filed: Feb. 28, 2000

(86) PCT No.: PCT/JP00/01149

§ 371 (c)(1),
(2), (4) Date: Nov. 6, 2000

(87) PCT Pub. No.: WO00/53828

PCT Pub. Date: Sep. 14, 2000

(30) Foreign Application Priority Data

Mar. 5, 1999 (JP) .......................................... 11-059333

(51) Int. Cl.$^7$ ...................... B01F 17/00; C09B 47/04; C25D 13/10; G02B 5/20
(52) U.S. Cl. ...................... 516/88; 106/413; 205/333; 252/582; 516/77; 516/88; 516/92
(58) Field of Search ............................. 516/77, 88, 92; 106/31.92, 413; 252/582; 205/333

(56) References Cited

U.S. PATENT DOCUMENTS

| | | | | |
|---|---|---|---|---|
| 3,577,379 A | * | 5/1971 | Sandler et al. | 106/413 X |
| 3,736,142 A | * | 5/1973 | Kaspaul et al. | 106/413 X |
| 3,947,287 A | * | 3/1976 | Belde et al. | 106/413 |
| 4,594,182 A | * | 6/1986 | Hashimoto et al. | 516/88 X |
| 4,937,274 A | * | 6/1990 | Arima et al. | 106/413 X |
| 5,203,974 A | * | 4/1993 | Kokado et al. | 516/77 X |
| 5,578,245 A | * | 11/1996 | Ziolo | 516/88 |
| 5,670,078 A | * | 9/1997 | Ziolo | 516/77 |

FOREIGN PATENT DOCUMENTS

| | | | |
|---|---|---|---|
| JP | 4-335602 | * | 11/1992 |
| JP | 10-310898 | * | 11/1998 |

* cited by examiner

Primary Examiner—Richard D. Lovering
(74) Attorney, Agent, or Firm—Oblon, Spivak, McClelland, Maier & Neustadt, P.C.

(57) ABSTRACT

A micelle dispersion containing hydrophobic particles, conductive particles and a surfactant of a ferrocene derivative dispersed in an aqueous medium. The surfactant of a ferrocene derivative in an equilibrium concentration contains an oxidized compound in a concentration of 40 µg/ml or less and a reduced compound in a concentration of 50 to 300 µg/ml. A process for producing a micelle dispersion including dispersing hydrophobic particles, conductive particles and a surfactant of a ferrocene derivative in an aqueous medium, where an oxidized compound in the surfactant of a ferrocene derivative is removed with at least one of an ion exchange resin and a reducing agent. A color filter can be produced in excellent yield without color overlapping by using the micelle dispersion and the process provides the micelle dispersion.

28 Claims, 1 Drawing Sheet

MICELLE DISPERSION AND METHOD FOR PREPARATION THEREOF

This application is a 371 of PCT/JP00/01149, filed Feb. 28, 2000.

TECHNICAL FIELD

The present invention relates to a micelle dispersion and a process for producing the micelle dispersion, and more particularly to a micelle dispersion which can provide a color filter in an excellent yield without color overlapping and a process for producing the micelle dispersion.

BACKGROUND ART

As the process for producing organic thin films comprising coloring materials and the like, the vacuum deposition process, the heat CVD (Chemical Vapor Deposition) process, the plasma CVD process, the ultra-high vacuum (the ion beam and molecular beam epitaxy) process, the LB (Langmuir-Blodgett) film process and the casting process have heretofore been used.

However, these processes have a problem in that thin films cannot be formed when a material for the thin films such as a coloring material has poor heat resistance or is insoluble in organic solvents because operations such as heating the material and dissolving the material in an organic solvent are required.

Recently, a process for producing a thin film by an electrolytic treatment has been proposed (Japanese Patent Application Laid-Open No. Showa 63(1988)-243298). In this process, a micelle dispersion is prepared by dispersing hydrophobic particles such as particles of coloring materials in an aqueous medium containing a dispersant and a thin film is formed on an electrode by an electrolytic treatment of the prepared micelle dispersion. Thin films can be easily prepared from materials having poor heat resistance or poor solubility in an aqueous medium in accordance with this process. Therefore, it has been attempted that color filters are produced in accordance with the above process comprising the electrolytic treatment (Japanese Patent Application (as a national phase under PCT) Laid-Open No. Showa 63(1988)-505384 and Japanese Patent Application Laid-Open No. Heisei 3(1991)-102302).

In the above process comprising the electrolytic treatment, the equilibrium concentration of a dispersant in a dispersion significantly affects the formation of thin films. For example, when the equilibrium concentration is very small, problems arise in that particles aggregate together during production of a dispersion to cause poor dispersion and that substrates are stained due to formation of rough pixels during formation of thin films and the spectroscopic property deteriorates. When the equilibrium concentration is very great, problems arise in that thin films are not formed occasionally in the film formation process even when an electric current is applied, that thin films are not formed in peripheral portions of pixels to cause formation of blank portions and that films are not formed uniformly in peripheral portions of a substrate. Therefore, reproducible production of thin films is possible only when the equilibrium concentration of hydrophobic particles in a dispersion is rigorously controlled.

In Japanese Patent Application Laid-Open No. Heisei 10(1988)310898, a process which comprises dipping a conductive substrate into a micelle dispersion containing a hydrophobic substance and a surfactant of a ferrocene derivative dispersed in an aqueous medium and producing a thin film of the hydrophobic substance while the fraction of an oxidized compound in the surfactant of a ferrocene derivative is kept in the range of 0 to 0.3, is described. However, when the above micelle dispersion is used for producing a color filter having thin films of three primary colors of R (red), G (green) and B (blue) and an electric current is passed successively through portions for forming the thin films of three primary colors, the problem of color overlapping such as green color laid over red color arises.

DISCLOSURE OF THE INVENTION

The present invention, has been made to overcome the above problems and has an object of providing a micelle dispersion which does not cause color overlapping in the production of a color filter by the electrolytic treatment and a process for producing the micelle dispersion.

As the result of intensive studies by the present inventors to achieve the above object, it was found that the object can be achieved by adjusting the concentrations of an oxidized compound and a reduced compound of a surfactant in the micelle dispersion within specific ranges. The present invention has been completed based on this knowledge.

The present invention provides a micelle dispersion which comprises hydrophobic particles, conductive particles and a surfactant of a ferrocene derivative dispersed in an aqueous medium, wherein the surfactant of a ferrocene derivative in an equilibrium concentration comprises an oxidized compound in a concentration of 40 $\mu$g/ml or less and a reduced compound in a concentration of 50 to 300 $\mu$g/ml.

The present invention also provides a process for producing a micelle dispersion which comprises dispersing hydrophobic particles, conductive particles and a surfactant of a ferrocene derivative in an aqueous medium, wherein an oxidized compound in the surfactant of a ferrocene derivative is removed with at least one of an ion exchange resin and a reducing agent.

In particular, in accordance with the above process, a micelle dispersion comprising an oxidized compound in a concentration of 40 $\mu$g/ml or less and a reduced compound in a concentration of 50 to 300 $\mu$g/ml can be obtained by removing the oxidized compound in the surfactant of a ferrocene derivative with at least one of an ion exchange resin and a reducing agent.

BRIEF DESCRIPTION OF THE DRAWINGS

The numbers and characters in Figures mean the following portions:
1: Silver paste
2: A window for a lead-out electrode
A: Electrode A
B: Electrode B
C: Electrode C

THE MOST PREFERRED EMBODIMENT TO CARRY OUT THE INVENTION

The hydrophobic particles used in the present invention are not particularly limited as long as the surface of the particles exhibits the hydrophobic property and various types of particles can be used. The hydrophobic particles can be classified into hydrophobic organic particles and hydro- phobic inorganic particles. Examples of the hydrophobic organic particles include particles of organic pigments, organic fluorescent materials, organic luminescent materials, organic photosensitive materials and organic polymers. There are no particular restrictions with respect to the particles of these materials.

Examples of the hydrophobic inorganic particles include inorganic particles such as particles of ITO (indium tin oxide), tin oxide and zinc which are conductive particles and particles of zinc oxide, titanium oxide, silica and alumina, which are treated on the surface to provide the hydrophobic property.

The form and the size of the hydrophobic organic and inorganic particles are not particularly limited. Powder having a diameter of 10 $\mu$m or smaller is preferably used.

The surfactant of a ferrocene derivative used in the present invention is a surfactant which comprises a ferrocene derivative as the effective component. Various surfactants such as nonionic surfactants, cationic surfactants and anionic surfactants are included. Examples of the surfactant of a ferrocene derivative include ferrocene derivatives of the ammonium type which are shown in Japanese Patent Application Laid-Open No. Showa 63(1988)-243298; ferrocene derivatives of the ether type and ferrocene derivatives of the ester type which are shown in International Patent Application Laid-Open No. WO89/01939; ferrocene derivatives of the pyridinium-type which are shown in Japanese Patent Application Laid-Open No. Heisei 1(1989)-226894; and various other ferrocene derivatives which are shown in Japanese Patent Application Laid-Open Nos. Heisei 2(1990)-83387, Heisei 2(1990)-83396, Heisei 2(1990)-96585, Heisei 2(1990)-188594, Heisei 2(1990)-235859, Heisei 2(1990)-250892, Heisei 2(1990)-250893, Heisei 2(1990)-256692, Heisei 2(1990)-256693, Heisei 4(1992)-26695 and Heisei 6(1994)-93497.

Among these surfactants of ferrocene derivatives, the following compounds are preferably used:

wherein PEG represents polyethylene glycol (the average molecular weight: 600).

The above surfactants of ferrocene derivatives may be used singly or in combination of two or more.

The preferred embodiments of the present invention will be described in the following.

In the present invention, as the first step, the hydrophobic particles and conductive particles are dispersed in an aqueous medium containing the surfactant of a ferrocene derivative as the dispersant. Examples of the aqueous medium include water, mixtures of water and alcohols, mixtures of water and acetone and other various aqueous dispersion media. The equilibrium concentration of the dispersant is not particularly limited as long as the hydrophobic particles can be dispersed. The equilibrium concentration is generally 10 $\mu$g/ml or greater and preferably 30 $\mu$g/ml or greater. The dispersant can be used in any great concentrations as long as the dispersant can be dissolved in the aqueous medium and there is no upper limit of the equilibrium concentration. The equilibrium concentration is defines as follows. In general, when hydrophobic particles are dispersed in a solution containing a dispersant, the dispersant is adsorbed to the surface of the hydrophobic particles and the concentration of the dispersant in the aqueous solution decreases due to this adsorption. The adsorption reaches an equilibrium after a sufficient period of time and the concentration of the dispersant in the aqueous solution becomes constant. The concentration of the dispersant in the aqueous solution in this condition is defined as the equilibrium concentration.

The equilibrium concentration will be described in the following with reference to the surfactant of a ferrocene derivative expressed by formula (I) as the example.

In an aqueous media, the dispersant (the agent for micelle formation) which works for dispersing a pigment is in two forms: (a) a neutral form and (b) a positively charged form. The two forms are reversibly converted to each other by the oxidation reaction and the reduction reaction. The compound of form (a) will be referred to as a reduced compound and the compound of form (b) will be referred to as an oxidized compound. The relation between the two compounds are shown in the following:

(a) Reduced compound    (b) Oxidized compound

The agent for micelle formation in form (a) is adsorbed to the surface of a pigment and contributes to the dispersion. When a dispersion of a pigment is prepared using the agent for micelle formation described above, the agent in form (a) alone is present in the initial period of the preparation of the dispersion. During the preparation of the dispersion or after the dispersion has been prepared, a portion of the agent for micelle formation is oxidized and the agent in form (b) is formed. The agent in form (b) is not adsorbed to the pigment and remains floating in the dispersion. A portion of the agent in form (a) is not adsorbed to the pigment and remains floating in the dispersion. The agents not adsorbed to the pigment and remaining floating in the dispersion are in equilibrium with the agent adsorbed to the pigment. After a sufficient period of time, i.e., when the dispersion is stabilized, the concentrations of the agents in various forms are constant. The equilibrium concentration means the total of the concentrations of the agent in form (a) and the agent in form (b) both remaining floating in the dispersion.

The equilibrium concentration of the dispersant can be measured by completely removing the hydrophobic particles by centrifugation and measuring the concentration of the dispersant remaining in the aqueous solution. The concentration of the surfactant of a ferrocene derivative as the dispersant can be measured by the analysis of iron.

The concentration of the hydrophobic particles is not particularly limited as long as the hydrophobic particles can be dispersed in the aqueous medium. The concentration is generally 0.1 to 50.0% by weight and preferably 0.5 to 30.0% by weight.

When the dispersion is prepared, a supporting salt (a supporting electrolyte) may be used, where necessary. The supporting salt is used to adjust the electric conductivity of the aqueous medium. The amount of the supporting salt is not particularly limited as long as the supporting salt does not adversely affect dispersing the hydrophobic particles. The supporting salt is used generally in an amount of about 0 to 300 parts by weight and preferably about 50 to 200 parts by weight per 1 part by weight of the above dispersant. The electrolysis may be conducted without using any supporting salt. When the electrolysis is conducted without using any supporting salt, a high purity thin film containing no supporting salt can be obtained. When the supporting salt is used, the supporting salt is not particularly limited as long as the supporting salt does not adversely affect formation of micelles or precipitation of the hydrophobic particles to an electrode and allows adjustment of the electric conductivity of the aqueous medium.

Preferable examples of the supporting salt include salts of sulfuric acid such as lithium, potassium, sodium, rubidium and aluminum sulfates; salts of acetic acid such as lithium, potassium, sodium, rubidium, beryllium, magnesium, calcium, strontium, barium and aluminum acetates; halogenated salts such as lithium, potassium, sodium, rubidium, calcium, magnesium and aluminum halides; and salts of water-soluble oxides such as lithium, potassium, sodium, rubidium, calcium, magnesium and aluminum salts of water-soluble oxides, which are generally used as the supporting salt. The supporting salt may be used singly or in combination of two or more.

To control the concentrations of the oxidized compound and the reduced compound, an ion exchange resin may be added to the dispersion to adsorb and remove the oxidized compound of the cationic surfactant of a ferrocene derivative or a reducing agent may be added to the dispersion to reduce the oxidized compound. In the equilibrium concentration of the surfactant of a ferrocene derivative, the concentration of the oxidized compound is controlled to 40 $\mu$g/ml or smaller and preferably 20 $\mu$g/ml or smaller and the concentration of the reduced compound is controlled to 50 to 300 $\mu$g/ml and preferably 100 to 200 $\mu$g/ml. An ion exchange resin and a reducing agent may be used in combination. When the concentration of the oxidized compound in the equilibrium concentration of the surfactant of a ferrocene derivative is greater than the above range, a film of a color is formed on an electrode which should not be coated with a film of this color in the preparation of the color filter (color overlapping). When the concentration of the reduced compound is smaller than the above range, the diameter of the dispersed pigment increases and the optical property of the obtained color filter becomes poor. When the concentration of the reduced compound is greater than the above range, color filters are not formed by electrolysis or films are not formed on end portions of the electrode pattern due to a decreased speed of the film formation.

As the ion exchange resin, cation exchange resins and chelate resins can be used. Ion exchange resins which selectively adsorb the oxidized compound of the surfactant of a ferrocene derivative and hardly adsorb the reduced compound are preferable. Specifically, methacrylic and acrylic weakly acidic cation exchange resins are preferable as the cation ion exchange resin and chelate resins of the iminodiacetic acid type are preferable as the chelate resin. The ion exchange resins are used after being converted into the lithium type. The resins of the lithium type contribute to the long time stability of the dispersion, in particular, when the dispersion is acidic because oxidation of ferrocene is suppressed due to selective removal of hydrogen ion.

As the reducing agent, reducing agents soluble in water are preferable. Examples of the reducing agent include salts of thiosulfuric acid, sulfurous acid, phosphorous acid, oxalic acid and citric acid. When the amount of the reduced compound of the surfactant of a ferrocene derivative is increased excessively by reduction of the oxidized compound, the excess amount of the surfactant of a ferrocene derivative can be removed by addition of an adsorbent. Examples of the adsorbent include silica, alumina, active carbon and crosslinked polymers such as crosslinked styrene-divinylbenzene copolymers. Among these adsorbents, the styrenic synthetic adsorbents having a nonpolar crosslinked structure having a specific surface area of 200 $m^2$/g or larger are preferable since these adsorbents can adsorb and remove the surfactant of a ferrocene derivative in a small amount without affecting the stability of the dispersion.

The dispersion of the hydrophobic particles prepared above is used without further treatments when the concentration of the hydrophobic particles is within a prescribed range. When the concentration is greater than a prescribed range, the concentration can be adjusted to a value within the prescribed range by diluting the dispersion with an aqueous medium. Where necessary, an adsorbent is added to adsorb an excess amount of the surfactant of a ferrocene derivative and the equilibrium concentration of the surfactant of a ferrocene derivative is adjusted to a value within a prescribed range. Then, the adsorbent and the hydrophobic particles having large diameters in the above dispersion are removed by a conventional method such as centrifugation and the object dispersion can be produced.

In the dispersion prepared as described above, it is preferable that the concentration of the hydrophobic particles is in the range of 0.2 to 10.0% by weight and more preferably 0.5 to 5.0% by weight. It is preferable that the equilibrium concentration of the reduced compound of the surfactant of a ferrocene derivative is in the range of 50 to 300 $\mu$g/ml and more preferably in the range of 100 to 200 $\mu$g/ml.

In conventional processes in which the equilibrium concentration cannot be adjusted after the dispersion has been prepared, the concentration of the hydrophobic particles in the prepared dispersion must be adjusted by controlling the concentration of the hydrophobic particles when the components are first mixed together. This arises based on the following phenomenon. When the hydrophobic particles are dispersed in a great concentration, a dispersant is required in an excess amount. It may be considered that, when the concentration of the hydrophobic particles is adjusted to the prescribed value by diluting the obtained dispersion, the equilibrium concentration of the dispersant may also be decreased along with the concentration of the hydrophobic particles and the prescribed concentrations can be achieved. However, in the actual operation, the hydrophobic particles aggregate together during the operation for producing the dispersion and the hydrophobic particles cannot be dispersed unless the dispersant is added in an amount more than the amount used above.

The equilibrium concentration of the dispersant can be measured in accordance with the method of solubilization of a dye, the electrochemical method and the plasma luminescence analysis described in the following.

(1) The Method of Solubilization of a Dye

After a dispersion of hydrophobic particles is treated by centrifugation, the supernatant solution is taken and the absorption spectrum of the solution is obtained by a measurement. Then, a dye is added to and dissolved in the solution. The excess amount of the dye is removed and a portion of the supernatant solution is taken. The absorption spectrum of this supernatant solution is obtained by a measurement. A differential spectrum between the spectrum of the solution obtained before addition of the dye and the spectrum of the solution obtained after addition of the dye is obtained by calculation. Separately, solutions are prepared by solubilizing the dye with various known amounts of the dispersant which is used for dispersing the hydrophobic particles and absorption spectra of these solutions are obtained by measurements. A calibration curve showing the relation between the concentration of the dispersant in the prepared solutions and the absorption spectrum of the prepared solutions is obtained. The equilibrium concentration of the dispersant is obtained from the calibration curve and the differential spectrum obtained above.

The dye which can be used for the above method is not particularly limited as long as the dye can be solubilized with the dispersant. For example, azo dyes and phthalocyanine dyes can be used. The centrifugal force in the treatment of centrifugation is not particularly limited as long as the hydrophobic particles are precipitated and the dispersant in the equilibrium concentration is not precipitated although the actual condition depends on the specific gravity of the hydrophobic particles.

(2) The Electrochemical Method

In accordance with the same procedures as those described in (1), a supernatant solution is taken after the centrifugation and the differential pulse voltametry is conducted.

The equilibrium concentration is calculated from the result obtained above and a calibration curve obtained in accordance with the differential pulse voltametry using various known amounts of the dispersant.

In the differential pulse voltametry, the presence or the absence of the peaks assigned to the oxidizing substance can be found. Therefore, it can be found whether the amount of addition of the ion exchange resin is suitable.

(3) The Plasma Luminescence Analysis

In accordance with the same procedures as those described in (1) the method of solubilization of a dye, a supernatant solution is taken after the centrifugation and the plasma luminescence analysis is conducted. The equilibrium concentration of the dispersant is calculated from the obtained result and a calibration curve prepared in advance.

To form a thin film on a substrate by the electrolytic treatment using the dispersion of the hydrophobic particles, a conductive substrate is dipped into the above dispersion and the electrolysis is conducted by passing an electric current through the substrate which is used as an electrode. A thin film of the hydrophobic particles can thus be formed on the conductive substrate. The condition of the electrolysis can be suitably selected in accordance with the situation. The temperature of the dispersion is generally 0 to 70° C. and preferably 5 to 25° C. and the voltage is generally 0.3 to 1.5 V and preferably 0.4 to 1.0 V.

As the conductive substrate, metal substrates such as aluminum substrate and insulating substrates such as glasses (glass containing no alkalis, quartz glass and soda lime glass), plastics and ceramics on which a conductive thin film such as films of ITO (indium tin oxide), tin dioxide, platinum, graphite, chromium, nickel and antimony oxide are formed, are used.

On the thin film of the hydrophobic particles thus formed on the conductive substrate, a protective film of an agent for forming a flat film may be formed as the post treatment, where necessary, to protect the surface. To form the protective film on the thin film, the substrate on which the thin film is formed is set at a spin coater. After droplets of the agent for forming a flat film are placed on the surface of the substrate using a dispenser, the substrate is rotated at a high speed and coated with the agent uniformly. The coated substrate is baked at a prescribed temperature for a prescribed time to cure the coating film and a protective film can be formed on the thin film.

A color filter is prepared by forming thin films of the three primary colors of R, G and B (R: red, G: green and B: blue) on a transparent substrate using dispersions of hydrophobic particles prepared as described above. Particles of organic pigments are used as the hydrophobic particles in the above dispersions.

In the preparation of the color filter, a transparent substrate having patterned transparent electrodes is used. A glass substrate having ITO electrodes formed with a pattern of stripes is preferable as the substrate.

As the organic pigments of R, G and B, pigments having excellent light resistance, heat resistance and chemical resistance are preferable. The pigment can be used singly or as a mixture of two or more.

Examples of the typical organic pigments in terms of the color index number (C. I.) include red pigments such as Pigment Reds 9, 81, 97, 122, 123, 144, 146, 149, 166, 168, 169, 177, 180, 192, 209, 215, 216, 217, 220, 223, 224, 226, 227, 228, 240 and 254; yellow pigments such as Pigment Yellows 1, 3, 12, 13, 14, 17, 20, 24, 34, 55, 74, 81, 83, 86, 93, 101, 109, 110, 113, 117, 125, 128, 129, 137, 138, 139, 147, 148, 150, 152, 153, 154, 166, 168, 173, 181, 185 and 199; orange pigments such as Pigment Oranges 13, 31,36, 38, 40, 42, 43, 51,.55, 59, 61, 64, 65 and 71; green pigments such as Pigment Greens 7 and 36; blue pigments such as Pigment Blues 15:1, 15:2, 15:3, 15:4, 15:6, 16, 22, 60 and 64; and violet pigments such as Pigment Violets 19, 23, 29, 30, 37, 40 and 50.

The organic pigments may contain conductive particles mixed with and dispersed in the pigments.

As the conductive particles used in the present invention, particles of ITO, conductive tin oxides $SnO_2$ and SnO.Sb and conductive zinc oxides such as zinc oxide doped with aluminum and zinc antimonate ($ZnO.Sb_2O_5$) and composite particles such as $SiO_2$, $TiO_2$ and barium sulfate coated with conductive tin oxides can be used. The conductive particles are used after the surface of the particles is made hydrophobic by the treatment with coupling agents or polymers. In combination with the above conductive particles of $SiO_2$, $TiO_2$, ZnO and $Al_2O_3$ which have been subjected to a hydrophobic treatment may also be occasionally used to adjust the thickness of the film in the film formation. The conductive particles may be used singly or in combination of two or more.

To form thin films of the organic pigments of the three primary colors constituting a color filter, a thin film of a desired color selected from red, green and blue is first formed with a desired pattern using a dispersion containing an organic pigment of the desired color in accordance with the procedures for preparation of a thin film described above. Subsequently, this procedure is conducted twice more using organic pigments of different colors in place of the pigment of the above color. Thus, a color filter having thin films of R, G and B can be obtained.

On the color filter having thin films of R, G and B obtained as described above, a protective film is formed as the post treatment, where necessary. The protective film is formed in accordance with the same procedures as those described above and the formed protective film protects the surface of the color filter having thin films of R, G and B.

A color filter can be prepared by forming an ITO film on the color filter having thin films of R, G and B obtained above in accordance with a conventional process.

The present invention will be described more specifically with reference to examples in the following. However, the present invention is not limited to the examples.

The equilibrium concentration of a surfactant of a ferrocene derivative and the concentration of an oxidized compound in a dispersion were determined by the measurements in accordance with the following methods.

A micelle dispersion was subjected to a centrifugal treatment using an ultracentifuge at 50,000 revolutions per minute (referred to as rpm, hereinafter) for 60 minutes. Hydrophobic particles were precipitated and a supernatant solution was taken. When the hydrophobic particles were left remaining in the supernatant solution, the above centrifugal treatment was repeated and the hydrophobic particles were completely removed (in general, the treatment was repeated 2 to 5 times).

The total concentration of the oxidized compound and the reduced compound of the surfactant of a ferrocene derivative which are not adsorbed to pigments was determined by the measurement of the concentration of iron in the supernatant solution in accordance with the plasma luminescence analysis and used as the equilibrium concentration.

The concentration of the oxidized compound of the surfactant of a ferrocene derivative was determined by the measurement of the absorbance of the supernatant solution at 627 nm. To calculate the concentration, solutions of the oxidized compound of the surfactant of a ferrocene derivative in known concentrations were prepared in advance by adding cerium(IV) sulfate to the reduced compound of the surfactant of a ferrocene derivative in an amount of 1.1 equivalent per 1 equivalent of the surfactant to completely oxidize the ferrocene portion into ferrocenium ion and the absorbance of the prepared solutions at 627 nm was measured. The concentration of the oxidized compound was obtained from these measurements. The limit of detection of the oxidized compound was 5 $\mu$g/ml. The concentration of the reduced compound was obtained by subtracting the concentration of the oxidized compound from the equilibrium concentration.

Preparation Example 1

(1) Preparation of a Dispersion of a Red Organic Pigment

To 1,000 parts by weight of pure water, 8.2 parts by weight of IDFE expressed by formula (I) described above as the surfactant of a ferrocene derivative, 50.0 parts by weight of a red pigment, C. I. Pigment Red 177, as the hydrophobic particles and 1.05 parts by weight of lithium bromide monohydrate were added and the components were mixed together. After being dispersed by an ultrasonic homogenizer, the mixture was treated by the centrifugal separation at 10,000 rpm and particles having large diameters were removed. After the content of solid components and the equilibrium concentration in the dispersion of the pigment which had been dispersed and classified were measured, the dispersion was diluted with a 0.01 mole/liter aqueous solution of lithium bromide containing 150 $\mu$g/ml of IDFE so that the concentration of solid components was adjusted to 2.0% by weight and a dispersion of a red pigment containing C. I. Pigment Red 177 was prepared.

Separately, to 1,000 parts by weight of pure water, 9.45 parts by weight of IDFE, 50.0 parts by weight of a yellow pigment, C. I. Pigment Yellow 83, as the hydrophobic particles and 1.05 parts by weight of lithium bromide monohydrate were added and the components were mixed together. After being dispersed by an ultrasonic homogenizer, the mixture was treated by the centrifugal separation at 10,000 rpm and particles having large diameters were removed. After the content of solid components and the equilibrium concentration in the dispersion of the pigment which had been dispersed and classified were measured, the dispersion was diluted with a 0.01 mole/liter aqueous solution of lithium bromide containing 150 $\mu$g/ml of IDFE so that the concentration of solid components was adjusted to 2.0% by weight and a dispersion of a yellow pigment containing C. I. Pigment Yellow 83 was prepared.

A dispersion of a red organic pigment was prepared by mixing 75 parts by weight of the dispersion of a red pigment containing C. I. Pigment Red 177 and 25 parts by weight of the dispersion of a yellow pigment containing C. I. Pigment Yellow 83.

(2) Preparation of a Dispersion of a Green Organic Pigment

To 1,000 parts by weight of pure water, 8.0 parts by weight of IDFE, 50.0 parts by weight of a green pigment, C. I. Pigment Green 36, as the hydrophobic particles and 1.05 parts by weight of lithium bromide monohydrate were added and the components were mixed together. After being dispersed by an ultrasonic homogenizer, the mixture was treated by the centrifugal separation at 8,000 rpm and particles having large diameters were removed. After the content of solid components and the equilibrium concentration in the dispersion of the pigment which had been dispersed and classified were measured, the dispersion was diluted with a 0.01 mole/liter aqueous solution of lithium bromide containing 150 $\mu$g/ml of IDFE so that the concentration of solid components was adjusted to 2.0% by weight and a dispersion of a green pigment containing C. I. Pigment Green 36 was prepared.

A dispersion of a pigment containing C. I. Pigment Yellow 83 was prepared in accordance with the same procedures as those conducted in A dispersion of a green organic pigment was prepared by mixing 82.5 parts by weight of the dispersion of a green pigment containing C. I. Pigment Green 36 and 17.5 parts by weight of the dispersion of a yellow pigment containing C. I. Pigment Yellow 83.

(3) Preparation of a Dispersion of a Blue Organic Pigment

To 1,000 parts by weight of pure water, 10.8 parts by weight of IDFE, 50.0 parts by weight of a blue pigment, C. I. Pigment Blue 15:6, as the hydrophobic particles and 1.05 parts by weight of lithium bromide monohydrate were added and the components were mixed together. After being dispersed by an ultrasonic homogenizer, the mixture was treated by the centrifugal separation at 10,000 rpm and particles having large diameters were removed. After the content of solid components and the equilibrium concentration in the dispersion of the pigment which had been dispersed and classified were measured, the dispersion was diluted with a 0.01 mole/liter aqueous solution of lithium bromide containing 150 $\mu$g/ml of IDFE so that the concentration of solid components was adjusted to 2.0% by weight and a dispersion of a blue organic pigment was prepared.

Preparation Example 2

[Preparation of a Substrate having Stripes of ITO Electrodes and Windows for Lead-out Electrodes]

Figure 1:
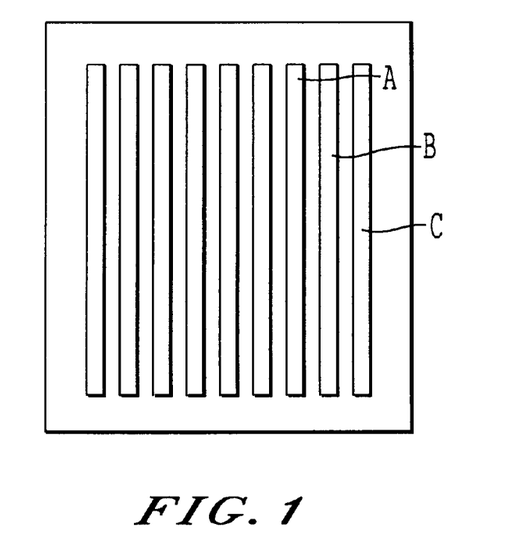
FIG. 1 shows a plan view of a substrate having stripes of ITO electrodes which was prepared in Preparation Example 2.

A glass substrate (320×300×0.7 mm; manufactured by GEOMATIC Company) which was coated with an ITO film having a sheet resistivity of 20 $\Omega$/□ was subjected to a patterning treatment and stripes of ITO electrodes having a width of 90 $\mu$m were formed at a distance of 20 $\mu$m between the electrodes. Thus, a substrate having the stripes of ITO electrodes shown in FIG. 1 was prepared.

Figure 2:
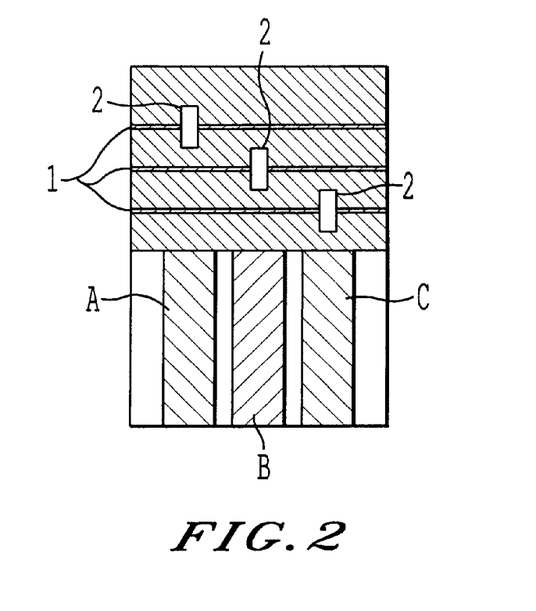
FIG. 2 shows a diagram describing preparation of lead-out electrodes in Preparation Example 2.

The substrate prepared above was spin coated with an acrylic resist (CT; manufactured by FUJI FILM OLIN Company) at 850 rpm and heated in an oven at 100° C. for 45 minutes. Then, while the position was accurately adjusted using a light exposure machine (the proximity gap: 60 $\mu$m), the coated substrate was exposed to light through a mask for forming lead-out electrodes (the energy of the exposed light of i-ray: 40 mJ/cm$^2$). After the exposed substrate was developed for 1 minute with a developer of an aqueous solution of an inorganic alkali (a 0.1N aqueous solution of sodium carbonate; manufactured by FUJI FILM OLIN Company; diluted with CD pure water), the substrate was washed with pure water and heated in an oven at 200° C. for 60 minutes. After windows for lead-out electrodes 2 shown in FIG. 2 were prepared, silver paste 1 was placed and lead-out electrodes were formed.

EXAMPLE 1

(1) Preparation of a Dispersion of Conductive Tin Oxide

To 1,000 parts by weight of pure water, 16.6 parts by weight of IDFE, 200.0 parts by weight of conductive tin oxide (manufactured by MITSUBISHI MATERIAL Co., Ltd.) which had been subjected to a hydrophobic treatment with isobutyltrimethoxysilane and 1.05 parts by weight of lithium bromide monohydrate were added and the components were mixed together. After the mixture was dispersed by an ultrasonic homogenizer, 50 parts by weight of a chelate resin of the iminodiacetic acid type (DIAION CR-11; manufactured by MITSUBISHI KAGAKU Co., Ltd.) which had been conditioned into the lithium type was added as the ion exchange resin and the mixture was mixed for 24 hours. Then, particles having large diameters were removed by the centrifugal separation at 3,000 rpm and the ion exchange resin was removed by filtration using a filter having a pore diameter of 1 $\mu$m. After the content of solid components in the obtained dispersion was measured, the dispersion was diluted with a 0.01 mole/liter aqueous solution of lithium bromide containing 100 $\mu$g/ml of IDFE so that the concentration of solid components was adjusted to 8.0% by weight and a dispersion of conductive tin oxide was prepared.

(2) Preparation of a Red Micelle Dispersion Containing Conductive Tin Oxide

A red micelle dispersion was prepared by mixing 62.5 parts by weight of the dispersion of a red organic pigment prepared in Preparation Example 1 and 37.5 parts by weight of the dispersion of conductive tin oxide prepared above. The equilibrium concentration of the surfactant and the concentrations of the oxidized compound and the reduced compound in the red micelle dispersion are shown in Table 1.

(3) Preparation of a Green Micelle Dispersion Containing Conductive Tin Oxide

A green micelle dispersion was prepared by mixing 62.5 parts by weight of the dispersion of a green organic pigment prepared in Preparation Example 1 and 37.5 parts by weight of the dispersion of conductive tin oxide prepared above. The equilibrium concentration of the surfactant and the concentrations of the oxidized compound and the reduced compound in the green micelle dispersion are shown in Table 1.

(4) Preparation of a Blue Micelle Dispersion Containing Conductive Tin Oxide

A blue micelle dispersion was prepared by mixing 62.5 parts by weight of the dispersion of a blue organic pigment prepared in Preparation Example 1 and 37.5 parts by weight of the dispersion of conductive tin oxide prepared above. The equilibrium concentration of the surfactant and the concentrations of the oxidized compound and the reduced compound in the blue micelle dispersion are shown in Table 1.

(5) Preparation of a Color Filter

The ITO substrate prepared in Preparation Example 2 was dipped into the red micelle dispersion prepared above and an electrode was connected to the R-rows in the stripes of the ITO electrodes. Electrolysis was conducted for 10 minutes using the ITO electrodes as the anodes and a stainless steel plate as the cathode at a constant electric potential of 0.5 V (based on the Ag/AgCl electrodes) and red thin films were formed. The substrate on which the red thin films were formed was washed with pure water and baked at 120° C. for 30 minutes as the post treatment. The substrate was then dipped into the green micelle dispersion prepared above and an electrode was connected to the G-rows of the stripes of the ITO electrodes. The electrolysis was conducted for 15 minutes at a constant electric potential of 0.5 V in the same manner as that described above and green thin films were formed. The post treatment was conducted in the same manner as that on the red thin films. Finally, the substrate was dipped into the blue micelle dispersion prepared above and an electrode was connected to the B-rows of the stripes of the ITO electrodes. The electrolysis was conducted for 10 minutes at a constant electric potential of 0.5 V in the same manner as that described above and blue thin films were formed. The post treatment was conducted in the same manner as that on the red thin film and a color filter having thin films of R, G and B was prepared. In the obtained color filter, films of the pigments were formed uniformly on the entire desired potions including end portions of the stripes. Mixing of the colors in the color filter was examined by measuring the decrease in the absorbance at 610 nm after forming and baking the films of the three colors from the corresponding absorbance immediately after forming and baking the first red films and the decrease in the absorbance at 545 nm after forming and baking the films of the three colors from the corresponding absorbance immediately after forming and baking the second green films. The results are shown in Table 1. As shown in Table 1, the decreases in the absorbances were very small and almost no color overlapping was found.

Comparative Example 1

To 1,000 parts by weight of pure water, 17.2 parts by weight of IDFE, 200.0 parts by weight of conductive tin oxide (manufactured by MITSUBISHI MATERIAL Co., Ltd.) which had been subjected to a hydrophobic treatment with isobutyltrimethoxysilane and 1.05 parts by weight of lithium bromide monohydrate were added and the components were mixed together. After the mixture was dispersed by an ultrasonic homogenizer, 50 parts by weight of a chelate resin of the iminodiacetic acid type (DIAION CR-11; manufactured by MITSUBISHI KAGAKU Co., Ltd.) which had been conditioned into the lithium type was added as the ion exchange resin and the mixture was mixed for 24 hours. Then, particles having large diameters were removed by the centrifugal separation at 3,000 rpm and the ion exchange resin was removed by filtration using a filter having a pore diameter of 1 $\mu$m. After the content of solid components in the obtained dispersion was measured, the dispersion was diluted with a 0.01 mole/liter aqueous solution of lithium bromide containing 500 $\mu$g/ml of IDFE so that the concentration of solid components was adjusted to 8.0% by weight and a dispersion of conductive tin oxide was prepared.

(2) Preparation of a Red Micelle Dispersion Containing Conductive Tin Oxide

A red micelle dispersion was prepared by mixing 62.5 parts by weight of the dispersion of a red organic pigment prepared in Preparation Example 1 and 37.5 parts by weight of the dispersion of conductive tin oxide prepared above. The equilibrium concentration of the surfactant and the concentrations of the oxidized compound and the reduced compound in the red micelle dispersion are shown in Table 1.

(3) Preparation of a Green Micelle Dispersion Containing Conductive Tin Oxide.

A green micelle dispersion was prepared by mixing 62.5 parts by weight of the dispersion of a green organic pigment prepared in Preparation Example 1 and 37.5 parts by weight of the dispersion of conductive tin oxide prepared above. The equilibrium concentration of the surfactant and the concentrations of the oxidized compound and the reduced compound in the green micelle dispersion are shown in Table 1.

(4) Preparation of a Blue Micelle Dispersion Containing Conductive Tin Oxide

A blue micelle dispersion was prepared by mixing 62.5 parts by weight of the dispersion of a blue organic pigment prepared in Preparation Example 1 and 37.5 parts by weight of the dispersion of conductive tin oxide prepared above. The equilibrium concentration of the surfactant and the concentrations of the oxidized compound and the reduced compound in the blue micelle dispersion are shown in Table 1.

(5) Preparation of a Color Filter

A color filter having thin films of R, G and B was prepared using the micelle dispersions of various colors prepared above in accordance with the same procedures as those conducted in Example 1. The obtained color filter had pigment films much thinner than those of the color filter prepared in Example 1. No film was formed at end portions of the stripes. The decreases in the absorbances were obtained in accordance with the same procedures as those conducted in Example 1 and the results are shown in Table 1.

Comparative Example 2

A color filter having thin films of R, G and B was prepared in accordance with the same procedures as those conducted in Example 1 except that the removal of the oxidized compound with the ion exchange resin was not conducted in (1) Preparation of a dispersion of conductive tin oxide. The decreases in the absorbances of the obtained color filter were obtained in accordance with the same procedures as those conducted in Example 1 and the results are shown in Table 1. As shown in Table 1, the decreases in the absorbances were great and the color overlapping took place.

Comparative Example 3

(1) Preparation of a Dispersion of ITO Particles

To 1,000 parts by weight of pure water, 4.0 parts by weight of FPEG expressed by formula (II) shown above as the surfactant of a ferrocene derivative, 50.0 parts by weight of ITQ particles (indium tin oxide; manufactured by MITSUBISHI MATERIAL Co., Ltd.) which had been subjected to a hydrophobic treatment with isobutyltrimethoxysilane and 1.05 parts by weight of lithium bromide monohydrate were added and the components were mixed together. After the mixture was dispersed by an ultrasonic homogenizer, particles having large diameters were removed by the centrifugal treatment at 1,500 rpm. After the content of solid components in the obtained dispersion was measured, the dispersion was diluted with a 0.01 mole/liter aqueous solution of lithium bromide so that the concentration of solid components was adjusted to 4.0% by weight and a dispersion of ITO particles was prepared.

(2) Preparation of a Red Micelle Dispersion Containing ITO Particles

A red micelle dispersion was prepared by mixing 50 parts by weight of the dispersion of a red organic pigment prepared in Preparation Example 1, 50 parts by weight of the dispersion of ITO particles prepared above and 1 part by weight of lithium bromide monohydrate. The equilibrium concentration of the surfactant and the concentrations of the oxidized compound and the reduced compound in the red micelle dispersion are shown in Table 1.

(3) Preparation of a Green Micelle Dispersion Containing ITO Particles

A green micelle dispersion was prepared by mixing 50 parts by weight of the dispersion of a green organic pigment prepared in Preparation Example 1 and 50 parts by weight of the dispersion of ITO particles prepared above. The equilibrium concentration of the surfactant and the concentrations of the oxidized compound and the reduced compound in the green micelle dispersion are shown in Table 1.

(4) Preparation of a Blue Micelle Dispersion Containing ITO Particles

A blue micelle dispersion was prepared by mixing 50 parts by weight of the dispersion of a blue organic pigment prepared in Preparation Example 1 and 50 parts by weight of the dispersion of ITO particles prepared above. The equilibrium concentration of the surfactant and the concentrations of the oxidized compound and the reduced compound in the blue micelle dispersion are shown in Table 1.

(5) Preparation of a Color Filter

The ITO substrate prepared in Preparation Example 2 was dipped into the red micelle dispersion prepared above and an electrode was connected to the R-rows of the stripes of the ITO electrodes. Electrolysis was conducted for 20 minutes using the ITO electrodes as the anodes and a stainless steel plate as the cathode at a constant electric potential of 0.5 V (based on the Ag/AgCl electrodes) and red thin films were formed. The substrate on which the red thin films were formed was washed with pure water and baked at 120° C. for 30 minutes as the post treatment. The substrate was then dipped into the green micelle dispersion obtained above and an electrode was connected to the G-rows of the stripes of the ITO electrodes. The electrolysis was conducted for 15 minutes at a constant electric potential of 0.5 V in the same manner as that described above and green thin films were formed. The post treatment was conducted in the same manner as that on the red thin film. Finally, the substrate was dipped into the blue micelle dispersion obtained above and an electrode was connected to the B-rows of the stripes of the ITO electrodes. The electrolysis was conducted for 15 minutes at a constant electric potential of 0.5 V in the same manner as that described above and blue thin films were formed. The post treatment was conducted in the same manner as that on the red thin film and a color filter having thin films of R, G and B was prepared. The decreases in the absorbances were obtained in accordance with the same procedures as those conducted in Example 1. The results are shown in Table 1. As shown in Table 1, the decreases in the absorbances were great and the color overlapping took place.

EXAMPLE 2

To 1,000 parts by weight of the dispersion of ITO particles prepared in Comparative Example 3 (1), 2.63 parts by weight of disodium hydrogencitrate 1.5 hydrate and 10 parts by weight of a synthetic adsorbent (SEPABEADS SP-207; manufactured by MITSUBISHI KAGAKU Co., Ltd.) were added and the mixture was stirred for 24 hours. Then, the adsorbent was removed by filtration with a filter having a pore diameter of 1 μm. A color filter having thin films of R, G and B was prepared in accordance with the same procedures as those conducted in Comparative Example 3 except that the dispersion of ITO particles prepared above was used. The decreases in the absorbances were obtained in accordance with the same procedures as those conducted in Example 1. The results are shown in Table 1. As shown in Table 1, the decreases in the absorbance were very small and almost no color overlapping was found.

TABLE 1

|  | Color of micelle dispersion | Equilibrium concentration (μg/ml) | Concentration of oxidized compound (μg/ml) | Concentration of reduced compound (μg/ml) | Mixing of colors (decrease in absorbance) | |
|---|---|---|---|---|---|---|
|  |  |  |  |  | red to 3 colors | green to 3 colors |
| Example 1 | red | 145 | 12 | 133 | 2% | 2% |
|  | green | 160 | 10 | 150 |  |  |
|  | blue | 148 | 18 | 130 |  |  |
| Example 2 | red | 185 | 35 | 150 | 2% | 2% |
|  | green | 110 | 28 | 82 |  |  |
|  | blue | 145 | 32 | 113 |  |  |
| Comparative Example 1 | red | 520 | 10 | 510 | 2% | 1% |
|  | green | 480 | 8 | 472 |  |  |
|  | blue | 515 | 15 | 500 |  |  |
| Comparative Example 2 | red | 206 | 146 | 60 | 20% | 15% |
|  | green | 195 | 120 | 75 |  |  |
|  | blue | 227 | 132 | 95 |  |  |
| Comparative Example 3 | red | 2100 | 210 | 1890 | 23% | 16% |
|  | green | 1950 | 180 | 1770 |  |  |
|  | blue | 2050 | 195 | 1855 |  |  |

INDUSTRIAL APPLICABILITY

As described above in detail, when a color filter is prepared using the micelle dispersion of the present invention, pigment films are formed uniformly on the surface for forming thin films of R, G and B, color overlapping does not take place and the color filter can be prepared with an excellent yield.

What is claimed is:

1. A micelle dispersion for providing a color filter which comprises hydrophobic particles, conductive particles and a surfactant of a ferrocene derivative dispersed in an aqueous medium, wherein the surfactant of a ferrocene derivative in an equilibrium concentration comprises an oxidized compound in a concentration of 40 μg/ml or less and a reduced compound in a concentration of 50 to 300 μg/ml, wherein the hydrophobic particles are particles selected from the group consisting of organic fluorescent materials, organic luminescent materials, organic photosensitive materials, and organic polymers.

2. The micelle dispersion as claimed in claim 1, wherein said hydrophobic particles have a diameter of 10 μm or smaller.

3. The micelle dispersion as claimed in claim 1, wherein said hydrophobic particles are present in a concentration of 0.1 to 50.0% by weight.

4. The micelle dispersion as claimed in claim 1, wherein said hydrophobic particles are present in a concentration of 0.5 to 30% by weight.

5. The micelle dispersion as claimed in claim 1, wherein the concentration of the oxidized compound is 20 μg/ml or smaller.

6. The micelle dispersion as claimed in claim 1, wherein the concentration of the reduced compound is 100 to 200 μg/ml.

7. The micelle dispersion as claimed in claim 1, wherein said hydrophobic particles are present in a concentration of 0.2 to 10% by weight.

8. The micelle dispersion as claimed in claim 1, wherein said hydrophobic particles are present in a concentration of 0.5 to 5.0% by weight.

9. The micelle dispersion as claimed in claim 1, wherein the surfactant of a ferrocene derivative is selected from the group consisting of

IDFE (I)

FPEG (II)

wherein PEG is polyethylene glycol.

10. The micelle dispersion as claimed in claim 9, wherein the average molecular weight of the polyethylene glycol moiety is 600.

11. A micelle dispersion for providing a color filter which comprises hydrophobic particles, conductive particles and a surfactant of a ferrocene derivative dispersed in an aqueous medium, wherein the surfactant of a ferrocene derivative in an equilibrium concentration comprises an oxidized compound in a concentration of 40 μg/ml or less and a reduced compound in a concentration of 50 to 300 μg/ml, wherein the hydrophobic particles are particles selected from the group consisting of indium tin oxide, tin oxide and zinc.

12. A micelle dispersion for providing a color filter which comprises hydrophobic particles, conductive particles and a surfactant of a ferrocene derivative dispersed in an aqueous medium, wherein the surfactant of a ferrocene derivative in an equilibrium concentration comprises an oxidized compound in a concentration of 40 μg/ml or less and a reduced compound in a concentration of 50 to 300 μg/ml, wherein said hydrophobic particles are selected from the group consisting of surface treated zinc oxide, surface treated titanium oxide, surface treated silica and surface treated alumina.

13. A micelle dispersion for providing a color filter which comprises hydrophobic particles, conductive particles and a surfactant of a ferrocene derivative dispersed in an aqueous medium, wherein the surfactant of a ferrocene derivative in an equilibrium concentration comprises an oxidized compound in a concentration of 40 μg/ml or less and a reduced compound in a concentration of 50 to 300 μg/ml, wherein said conductive particles are selected from the group consisting of particles of SnO.Sb, zinc oxide doped with aluminum, and zinc antimonate.

14. A process for producing a micelle dispersion which comprises dispersing hydrophobic particles, conductive particles and a surfactant of a ferrocene derivative in an aqueous medium, wherein an oxidized compound in the surfactant of a ferrocene derivative is removed with at least one of an ion exchange resin and a reducing agent.

15. The process as claimed in claim 14, wherein the hydrophobic particles are particles selected from the group consisting of organic fluorescent materials, organic luminescent materials, organic photosensitive materials, and organic polymers.

16. The process as claimed in claim 14, wherein the hydrophobic particles are particles selected from the group consisting of indium tin oxide, tin oxide and zinc.

17. The process as claimed in claim 14, wherein said hydrophobic particles are selected from the group consisting of surface treated zinc oxide, surface treated titanium oxide, surface treated silica and surface treated alumina.

18. The process as claimed in claim 14, wherein said hydrophobic particles have a diameter of 10 $\mu$m or smaller.

19. The process as claimed in claim 14, wherein said hydrophobic particles are dispersed in a concentration of 0.1 to 50.0% by weight.

20. The process as claimed in claim 14, wherein said hydrophobic particles are dispersed in a concentration of 0.5 to 30% by weight.

21. The process as claimed in claim 14, wherein said hydrophobic particles are dispersed in a concentration of 0.2 to 10% by weight.

22. The process as claimed in claim 14, wherein said hydrophobic particles are dispersed in a concentration of 0.5 to 5.0% by weight.

23. The process as claimed in claim 14, wherein said conductive particles are selected from the group consisting of particles of SnO.Sb, zinc oxide doped with aluminum, and zinc antimonate.

24. A process according to claim 14, wherein the surfactant of a ferrocene derivative in an equilibrium concentration in the micelle dispersion comprises an oxidized compound in a concentration of 40 $\mu$g/ml or less and a reduced compound in a concentration of 50 to 300 $\mu$g/ml.

25. The process as claimed in claim 24, wherein the concentration of the oxidized compound is 20 $\mu$g/ml or smaller.

26. The process as claimed in claim 24, wherein the concentration of the reduced compound is 100 to 200 $\mu$g/ml.

27. The process as claimed in claim 14, wherein the surfactant of a ferrocene derivative is selected from the group consisting of

IDFE   (I)

FPEG   (II)

wherein PEG is polyethylene glycol.

28. The process as claimed in claim 27, wherein the average molecular weight of the polyethylene glycol moiety is 600.

* * * * *